(12) United States Patent
Takano et al.

(10) Patent No.: US 7,199,835 B2
(45) Date of Patent: *Apr. 3, 2007

(54) METHOD FOR SWITCHING SIGNAL INPUT BASED ON DEVICE CAPABILITY

(75) Inventors: Hiroshi Takano, San Diego, CA (US); Satoshi Kobayashi, Tokyo (JP); Kazuhiro Suzuki, Kanagawa (JP); Makoto Sato, Tokyo (JP); Yuji Kimura, Tokyo (JP)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 352 days.

This patent is subject to a terminal disclaimer.

(21) Appl. No.: 10/779,145

(22) Filed: Feb. 12, 2004

(65) Prior Publication Data

US 2004/0160531 A1    Aug. 19, 2004

Related U.S. Application Data

(63) Continuation of application No. 09/540,150, filed on Mar. 31, 2000, now Pat. No. 6,731,347.

(60) Provisional application No. 60/128,536, filed on Apr. 9, 1999.

(51) Int. Cl.
*H04N 5/46* (2006.01)

(52) U.S. Cl. ............... 348/558; 348/555; 348/705; 348/725; 725/139

(58) Field of Classification Search ............... 348/558, 348/555–556, 570, 725–729, 705, 554, 731, 348/180; 725/63, 68, 100, 131, 151, 59, 725/137

See application file for complete search history.

(56) References Cited

U.S. PATENT DOCUMENTS 5,461,427 A    10/1995    Duffield

(Continued)

*Primary Examiner*—Trang U. Tran
(74) *Attorney, Agent, or Firm*—Blakely, Sokoloff, Taylor & Zafman LLP (57) ABSTRACT

A method and apparatus for switching input terminals based on device capability are disclosed. The method supplies a digital signal and an analog signal to a device. The method includes examination of whether or not a device is receiving a digital signal in an eligible format. The method also selects an analog input terminal to receive an analog signal unless the digital signal is being provided in the eligible format. The apparatus includes a digital input terminal to receive a digital signal, an analog input terminal to receive an analog signal, an IEEE1394 interface coupled with the digital input terminal, a HD decoder coupled with the IEEE1394 interface, a memory and a selector which selects the digital input terminal if the digital signal is in an eligible format for the device. The apparatus otherwise selects the analog input terminal. The selector may include a controller for examining whether or not the decoder is capable of decoding the digital signal, and a switch controlled by the controller so as to select the digital input terminal if the decoder is capable of decoding the digital signal, otherwise to select the analog input terminal.

37 Claims, 6 Drawing Sheets

U.S. PATENT DOCUMENTS

| | | |
|---|---|---|
| 5,574,965 A | 11/1996 | Welmer |
| 5,581,310 A | 12/1996 | Vinekar et al. |
| 5,598,221 A | 1/1997 | Miyahara et al. |
| 5,666,170 A | 9/1997 | Stewart |
| 5,666,363 A | 9/1997 | Osakabe et al. |
| 5,717,471 A | 2/1998 | Stewart |
| 5,774,193 A | 6/1998 | Vaughan |
| 5,774,195 A | 6/1998 | Miyahara et al. |
| 5,787,259 A | 7/1998 | Haroun et al. |
| 5,802,017 A | 9/1998 | Sato et al. |
| 5,828,418 A | 10/1998 | Lee |
| 5,850,266 A | 12/1998 | Gimby |
| 5,883,621 A | 3/1999 | Iwamura |
| 5,926,228 A | 7/1999 | Jeon et al. |
| 5,933,430 A | 8/1999 | Osakabe et al. |
| 5,936,667 A | 8/1999 | Saib et al. |
| 5,940,737 A | 8/1999 | Eastman |
| 5,963,842 A | 10/1999 | Kinugawa |
| 5,973,625 A | 10/1999 | Nam |
| 5,973,748 A | 10/1999 | Horiguchi et al. |
| 6,049,830 A | 4/2000 | Saib |
| 6,072,983 A | 6/2000 | Klosterman |
| 6,091,458 A | 7/2000 | Jeon et al. |
| 6,104,437 A | 8/2000 | Taira et al. |
| 6,166,774 A | 12/2000 | Plonka |
| 6,204,884 B1 | 3/2001 | Lee |
| 6,216,266 B1 | 4/2001 | Eastman et al. |
| 6,285,408 B1 | 9/2001 | Choi et al. |
| 6,285,824 B1 | 9/2001 | Yanagihara et al. |
| 6,335,762 B1 | 1/2002 | Lee |
| 6,344,871 B1 | 2/2002 | Liu et al. |
| 6,349,115 B1 | 2/2002 | Tahara et al. |
| 6,369,857 B1 | 4/2002 | Balaban et al. |
| 6,373,527 B1 | 4/2002 | Lee |
| 6,377,309 B1 | 4/2002 | Ito et al. |
| 6,380,984 B1 | 4/2002 | Inoue et al. |
| 6,430,233 B1 | 8/2002 | Dillon et al. |
| 6,437,834 B1 | 8/2002 | Tagami |
| 6,490,002 B1 | 12/2002 | Shintani |
| 6,577,350 B1 | 6/2003 | Proehl et al. |
| 6,731,347 B1 * | 5/2004 | Takano et al. .............. 348/558 |
| 2002/0012069 A1 | 1/2002 | Murakami |

* cited by examiner

| Situation | Step | Action by User | Signal Flow | IRD | DTV |
|---|---|---|---|---|---|
| Watch IRD[HD] | 1 | DTV "Input Select to IRD" |  | | (P-to-P with IRD, Input from CH X, decoding HD) |
| Watch IRD[SD] | 2 | |  | Output Transport Stream to CH X | Recognize DSS-SD |
| | 3 | |  | | Recognize DSS-SD, Change input to IRD-Analog |

Fig. 4

DSS Dec

| entry_ID | entry_type | Source | Destination | format |
|---|---|---|---|---|
| 1 | Destination | iPCR0 | Tuner d#1 | DSS |
| 2 | Destination | iext2 | Tuner d#2 | Ant. |
| 3 | Source | Tuner s#1 | oAPR0 | JPEG |
| 4 | Source | Tuner s#1 | oAPR0 | Text |
| 5 | Source | Tuner s#2 | oPCR0 | DSS |
| 6 | Source | Tuner s#2 | oExt0 | Analog AV |
| 7 | Transform | iPCR0 | oExt0 | DSS->AnalogAV |

Fig. 5

| entry_ID | entry_type | Source | Destination | format |
|---|---|---|---|---|
| 1 | Destination | iPCR0 | Tuner d#1 | MPEG |
| 2 | Destination | iext2 | Tuner d#2 | Ant. |
| 3 | Destination | iPCR0 | Monitor d#1 | MPEG |
| 4 | Destination | iext1 | Monitor d#1 | Analog AV |
| 5 | Destination | iext0 | Monitor d#1 | Analog AV |
| 6 | Internal | Tuner s#2 | Monitor d#1 | MPEG |
| 7 | Source | Tuner s#1 | oAPR0 | Text |
| 8 | Source | Tuner s#1 | oAPR0 | JPEG |
| 9 | Source | Tuner s#2 | oPCR0 | MPEG |
| 10 | Source | Tuner s#2 | oExt0 | AnalogAV |

Fig. 6 ered to process digital signals as
METHOD FOR SWITCHING SIGNAL INPUT BASED ON DEVICE CAPABILITY This application is a continuation of U.S. patent application Ser. No. 09/540,150 filed on Mar. 31, 2000 now U.S. Pat. No. 6,731,347, which claims the benefit of U.S. Provisional Application No. 60/128,536 filed Apr. 9, 1999.

BACKGROUND

1. Field of the Invention

The present invention is related to the field of signal transmission. More specifically, the present invention is a method and apparatus for switching input terminals based on a device's capability.

2. Related Art

Use of digital interfaces is a trend in signal transmission, as a result of recent developments in digital signal processing technologies. Analog video and audio signals are digitized and coded, or compressed, before being transmitted. Various types of compression techniques, including DVI (Digital Video Interactive) and MPEG (Motion Picture Experts Group) compression, have been developed to achieve high-performance digital signal transmission. Standards developed for digital interfaces, such as IEEE1394, allow digital signals in various formats to be transmitted through a single digital interface. Such standards, however, do not regulate the formats in which the signal is coded, nor control the transmission path through which the signal is transmitted.

It is vital to ensure that a device that receives a digital signal in a particular format is capable of decoding it to recover an original signal from it. This requirement was relatively easy to satisfy when digital signals were coded and transmitted in a limited number of formats such as the DV (Digital Video) format. Development of digital signal processing technologies has led to different formats, and distinctive modes exist for some formats with regard to the transmission speed and bandwidth of the signal. Devices that receive and use transmitted signals are not necessarily provided with decoders corresponding to the various formats, due to economic reasons. One problem that has emerged is that an incoming signal is not always received in a usable format, and if this is the case, a device using the signal cannot decode the transmitted digital signal. A digital TV that can process digital signals exclusively in the format based on the MPEG Standard, for example, cannot process signals coded in the DV format or the DSS (Digital Satellite System) format.

In addition to the differences between the coding formats of digital signals, signals are not always transmitted in a digital format but also in an analog format, particularly in a transition period from analog to digital, while both formats are in use. In other words, analog signals can co-exist with digital signals.

Some transmitters and receivers, having both analog and digital interfaces, are designed to process digital signals as well as analog. In order to transmit an analog signal to such a device, the signal has to be transmitted through the analog interface. Otherwise the signal cannot be transmitted to the receiver. It is vital, therefore, to select an appropriate transmission path, i.e., the digital interface or the analog interface, depending upon the type of the signal, digital or analog.

For the foregoing reasons, there is a need for a method for switching input terminals based on a device's capability.

SUMMARY

The present invention is directed to a method and apparatus that satisfies the need for switching between input terminals based on a transmitted signal format.

Whether or not a device is receiving a digital signal at a digital input terminal in a usable format is examined; and an analog input terminal is selected to receive an analog signal unless the digital signal is being provided in the usable format.

More specifically, the method includes receiving a digital signal at a digital input terminal of a device, receiving an analog signal at an analog input terminal of the device, examining whether or not the digital signal is in a usable format for the device, and selecting the digital signal if the digital signal is in the usable format, otherwise selecting the analog signal, as an input for the device. The digital signal and the analog signal may be supplied to the device simultaneously.

An apparatus to which the present invention is directed includes a digital input terminal which receives a digital signal, an analog input terminal which receives an analog signal an IEEE1394 interface coupled with the digital input terminal, a decoder coupled with the IEEE1394 interface, a memory and a selector which selects the digital input terminal if the digital signal is in a usable format for the apparatus, otherwise it selects the analog input terminal. The selector may include a controller for examining whether or not the decoder is capable of decoding the digital signal, and a switch controlled by the controller so as to select the digital input terminal if the decoder is capable of decoding the digital signal, otherwise to select the analog input terminal.

According to the present invention, it is possible to supply a usable signal in an analog form even though a digital signal is received in a format that the device cannot decode. Therefore, a user of digital equipment does not have to manually change the input terminal.

DETAILED DESCRIPTION OF THE INVENTION

Referring to the figures, exemplary embodiments of the invention will now be described. The exemplary embodiments are provided to illustrate the invention and should not be construed as limiting the scope of the invention.

Consider a case where a digital television (DTV) receives an audio/video signal via a digital satellite-broadcasting receiver.

Figure 1:
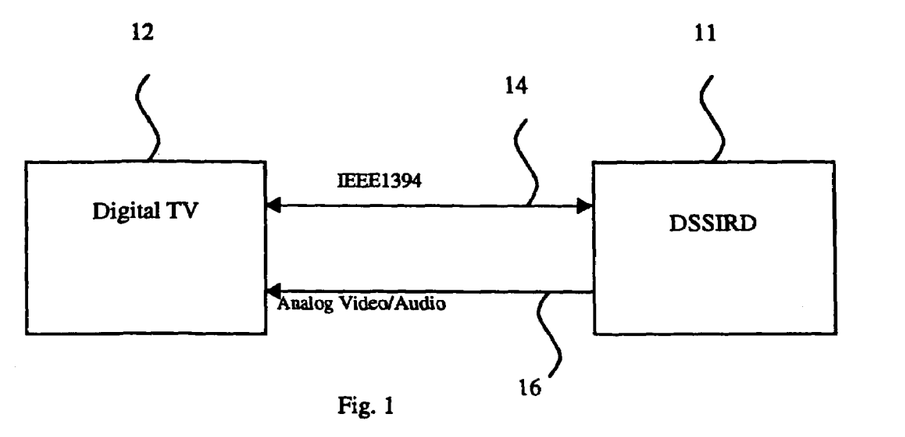
FIG. 1 illustrates an exemplary signal transmitting system comprising a satellite broadcasting receiver (DSS-IRD) and a digital television (DTV).

FIG. 1 illustrates an exemplary arrangement of a signal transmitting system which includes two electronic devices, i.e., a DSS-IRD (Digital Satellite System Integrated Receiver Decoder) 11 and a digital TV (DTV) 12. In this embodiment of the present invention, these devices are connected to each other by an IEEE1394 digital interface cable 14 as well as an analog video/audio cable 16.

The digital interface cable 14 is based upon the IEEE1394 Standard for a high-performance serial bus, and provides a peer-to-peer interface between various digital peripherals with up to 63 isochronous digital communication channels. The IEEE1394 digital interface 14 is capable of carrying digital video/audio signals in various digital formats, such as the DVI format and MPEG1/2 formats. Assuming that both the DSS-IRD 11 and the DTV 12 are also based upon the IEEE1394 Standard, the digital interface cable 14 allows a digital video/audio signal from the DSS-IRD 11 to be transmitted to the DTV 12. In addition to the digital interface 14, the analog audio/video cable 16 is provided between the DSS-IRD 11 and the DTV 12, because both a digital signal and an analog signal can be provided from the DSS-IRD 11.

The DSS-IRD 11 is a satellite broadcasting receiver based upon the DSS Standard, which is one of the standards for satellite broadcasting in the United States. According to the DSS Standard, an audio/video signal is digitized and coded in the MPEG2 format, which is one of the global standards for video compression. The coded signal including program-related information is transmitted in two original modes of the DSS Standard, i.e., SD (Standard Definition) and HD (High Definition).

The SD mode is designed for transmitting an MPEG2 signal in a standard quality, whereas the HD mode is for high-quality transmission. Since the SD mode is the DSS's unique mode, a DSS-SD decoder is required to decode a signal transmitted in this mode. The HD mode is, on the other hand, partly based upon the ATSC (Advanced Television Systems Committee) system, which is used for surface digital broadcasting in the United States. To decode a signal transmitted in the HD mode, an ATSC decoder may be used.

Under such a circumstance, the DSS-IRD 11 will not need to have an expensive DSS-HD decoder, if the DTV 12 with a built-in ATSC decoder is provided with a decoding function for DSS-HD signals. In this case, signals can be transmitted to the DTV 12 in different formats. Namely, a DSS-SD signal received at the DSS-IRD 11 is decoded into an analog signal in the DSS-IRD 11, and then the analog signal is transmitted to the DTV 12 via the analog video/audio cable 16. A DSS-HD signal is, meanwhile, received at the DDS-IRD 11 and is transmitted through the digital interface cable 14 to the DTV 12. The digital signal is then decoded in the DTV 12 into an analog signal.

Figure 2:
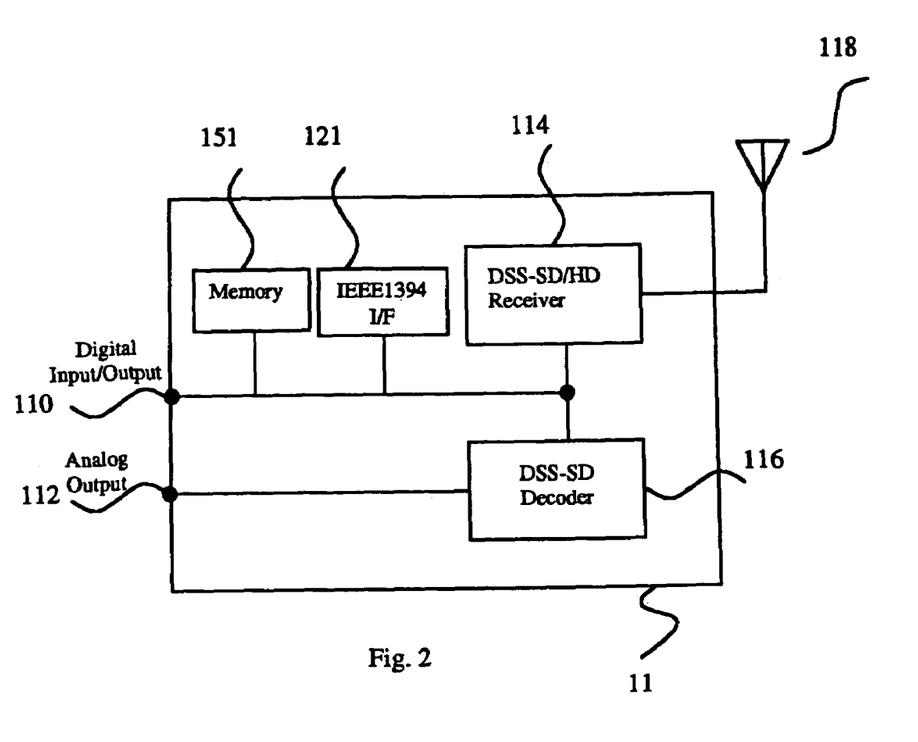
FIG. 2 illustrates an exemplary arrangement of a DSS-IRD in a block diagram.
Figure 3:
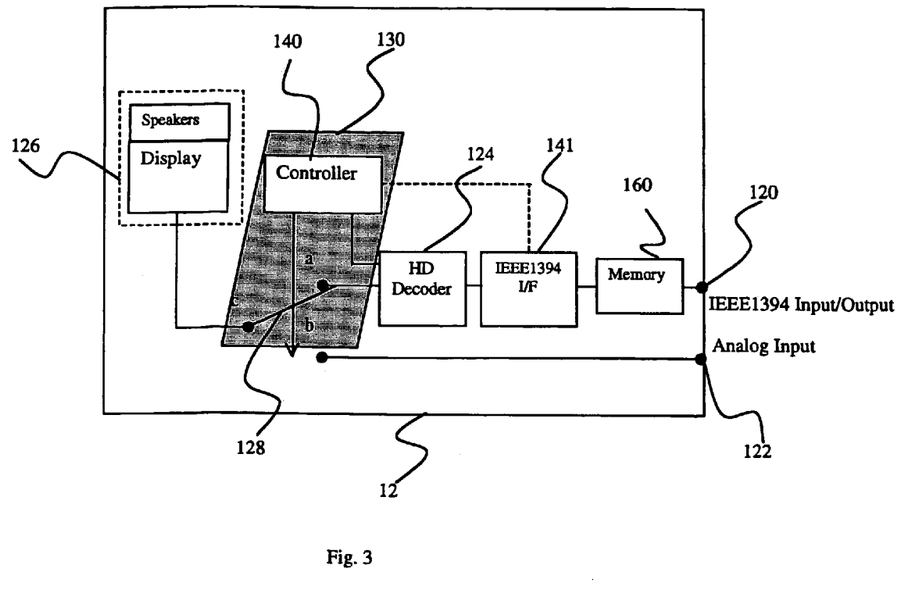
FIG. 3 illustrates an exemplary arrangement of a DTV in a block diagram.

FIGS. 2 and 3 illustrate exemplary arrangements of the DSS-IRD 11 and the DTV 12, respectively.

As shown in FIG. 2, the DSS-IRD 11 includes a DSS-SD/HD receiver 114, a DSS-SD decoder 116, a digital input/output terminal 110, and an analog output terminal 112, and an IEEE1394 interface 121, and a memory 151. It is noted that the DSS-IRD 11 does not have a DSS-HD decoder but only the DSS-SD decoder 116. The memory in the present embodiment is provided in configuration ROM (Read Only Memory). However, one skilled in the art will recognize that other storage devices may be used.

The receiver 114, connected to an antenna 118, is capable of receiving both DSS-SD and DSS-HD signals from a satellite. These digital signals received at the receiver 114 will be supplied to the digital input/output terminal 110. In addition, the receiver 114 also provides the digital signals to the DSS-SD decoder 116, which decodes the DSS-SD signal into an analog audio/video signal. When a DSS-SD signal is being received, therefore, the DSS-SD decoder 116 will supply to the analog output terminal 112 an analog audio/video signal, which is derived from the digital signal.

As shown in FIG. 3, the DTV 12 has a digital input/output terminal 120, an analog input terminal 122, an HD decoder 124, a monitor 126 including a display and speakers, an IEEE1394 interface 141, a switch 128 for selecting an input terminal, and a selector 130 including a controller 140 to control the switch 128, and a memory 160. The memory in the present embodiment is provided in configuration ROM (Read Only Memory). However, one skilled in the art will recognize that other storage devices may be used. As illustrated in FIG. 1, the digital input/output terminal 120 communicates with the digital input/output terminal 100 of the DSS-IRD 11 via the digital interface cable 14, so that it receives both DSS-SD and DSS-HD signals from the DSS-IRD 11. The analog input terminal 122 is connected to the analog output terminal 102 by the analog video/audio cable 16, so that an analog audio/video signal can be received.

Within the DTV 12, the HD decoder 124 decodes an incoming DSS-HD signal transmitted through the digital interface cable 14 that arrives at the digital input terminal 120 and passes through the IEEE1394 interface 141. When an HD signal is transmitted from the DDS-IRD 11, the HD decoder 124 will decode the digital signal into a corresponding analog audio/video signal, which will be generated on the monitor 126, and supply it to a first terminal "a" of the switch 128.

An analog audio/video signal is also obtained at the analog input terminal 122, when a DSS-SD signal is being received at the DSS-IRD 11. The analog audio/video signal, which is decoded by the DSS-SD decoder 116 of the DSS-IRD 11, is provided to a second terminal "b" of the switch 128. Accordingly, an analog audio/video signal will be supplied from either the terminal "a" or "b" to the monitor 126 via a third terminal "c" of the switch 128.

The controller 140 controls the switch 128 based upon the DTV's capability of decoding an incoming digital signal. More specifically, the controller 140 monitors the output of the HD decoder 124, and will control the switch 128 to select its first terminal "a" if the HD Decoder 124 provides an analog audio/video signal, otherwise will direct the switch 128 to select its second terminal "b."

Each device can have a capability list. The capability list may be stored in a device's memory. The memory in the present embodiment is provided in configuration ROM (Read Only Memory). However, one skilled in the art will recognize that other storage devices may be used to store a capability list. Since configuration ROM typically does not have much room to store information, e.g. 1024 bytes, keywords or brief information may be stored. Therefore, to store detailed information, additional memory units can be used.

Such capability information may be stored using a descriptor based upon the IEEE1394 Standard p1212r 64-bit fixed addressing. A descriptor is a leaf (a contiguous information field pointed to by a configuration ROM directory entry) that provides additional information to describe an object associated with a directory entry in configuration ROM.

Figure 5:
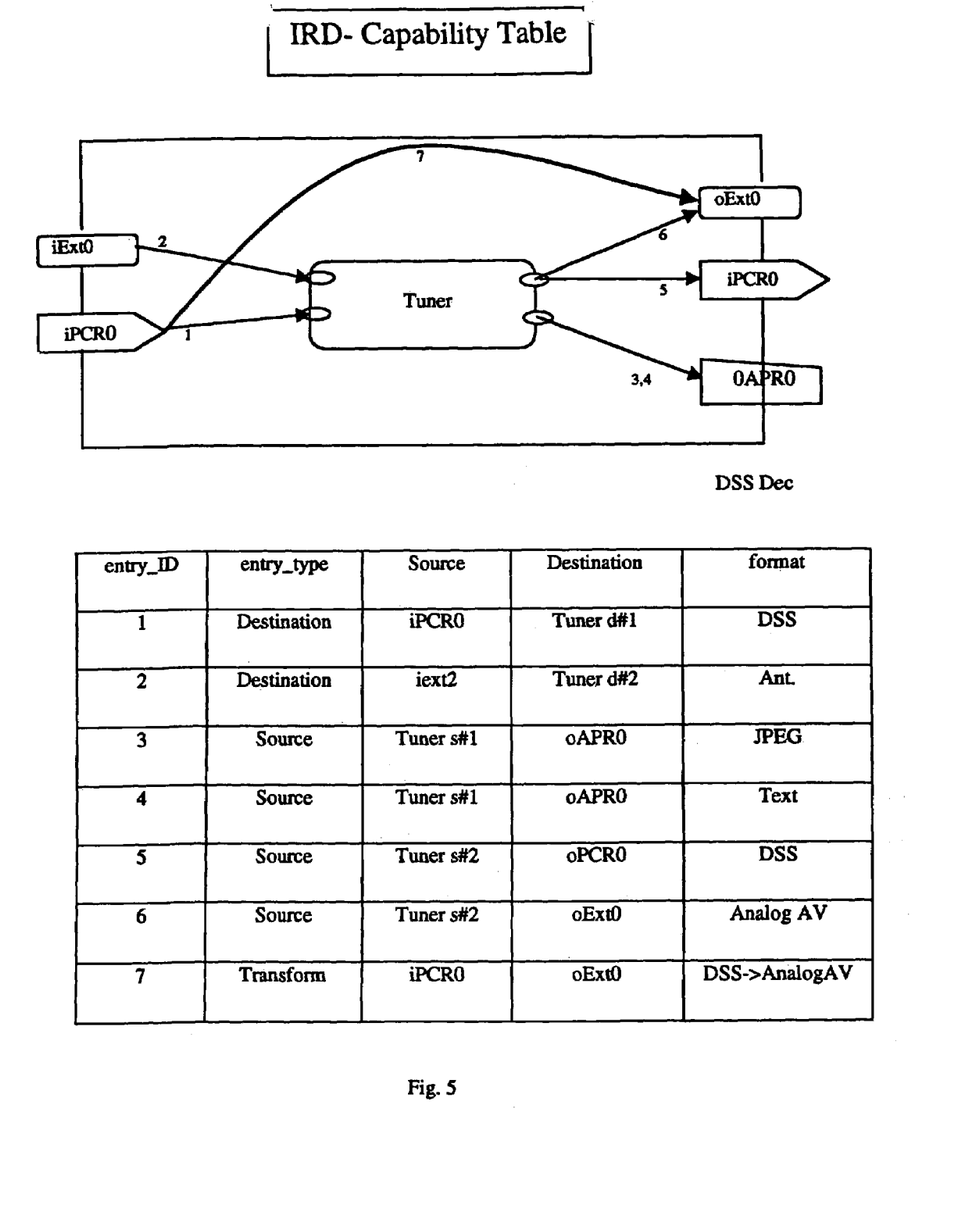
FIG. 5 illustrates a capability table for a DSS-IRD.
Figure 6:
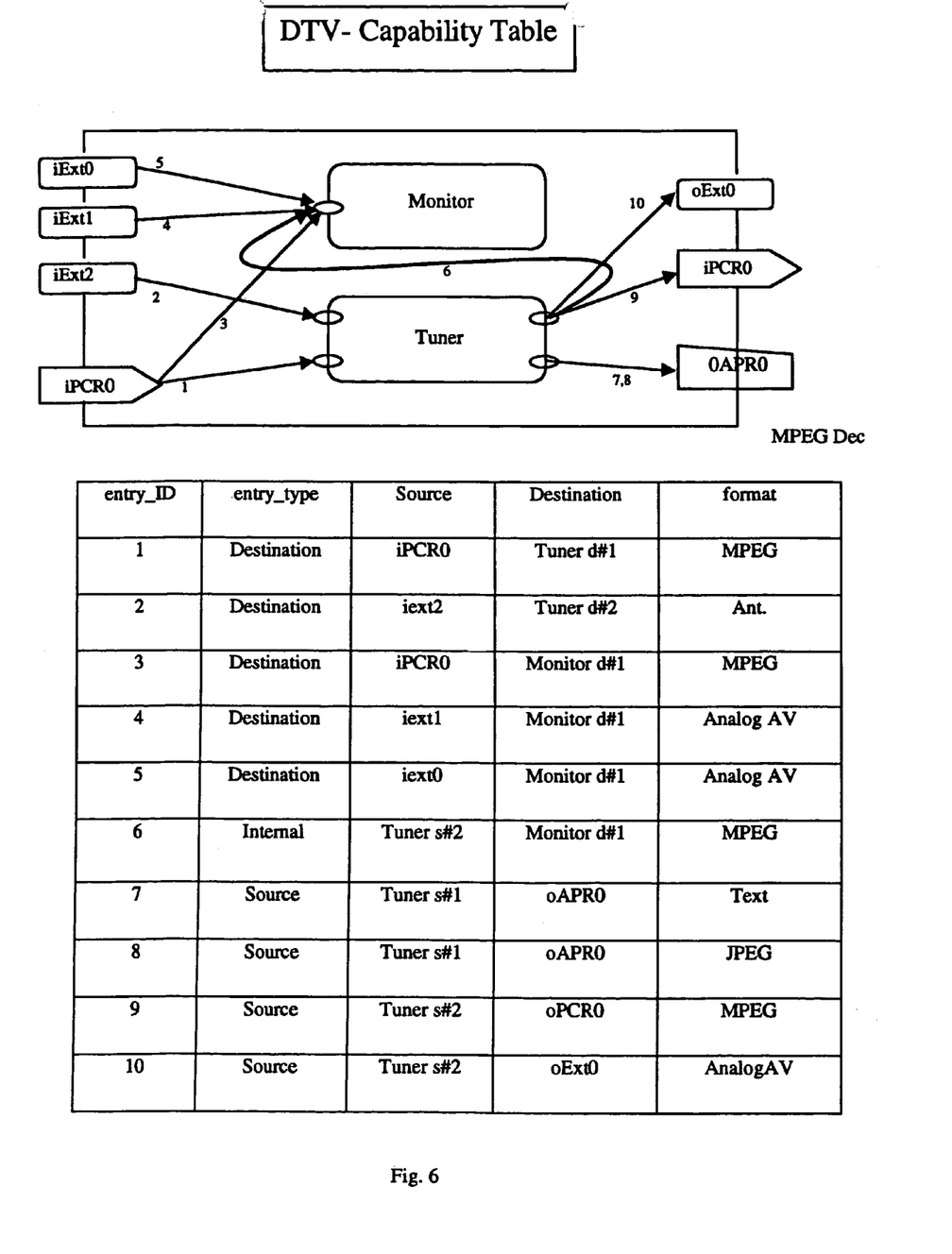
FIG. 6 illustrates a capability table for a DTV.

Devices may inquire into the capabilities of other devices by issuing a command on the IEEE1394 digital interface 14 to receive capability information. The queried device then responds to the inquiry command and will send the information to the device that issued the query command on the IEEE1394 digital interface 14. Two examples of a capability list are illustrated in FIGS. 5 and 6, for IRD and DTV capabilities, respectively.

In the case of DTV, since each device has a capability list, DTV can select compatible devices according to the information in their capability list. Once the device is selected, the DTV establishes an isochronous connection. Depending upon the selected device's status, the selected device may output a signal onto the IEEE1394 digital interface 14 where the DTV picks up the signal. The output signal from the selected device has a field to indicate the signal format type. The format type, which may be changed dynamically, depends on the contents or situation of the device. For example, a Digital VHS can play MPEG2, DSS and analog. The DTV keeps monitoring the signal format field to determine whether to process the signal or not. This is a second stage of determination. For instance, if the signal is MPEG2, a selector 130 enables HD decoder 124 and selects switch "a" to feed the signal to a monitor 126. If the signal is analog, the selector 130 selects switch "b." If the signal is such that it is not compatible for this particular DTV, DV for example, then selector 130 may disable HD decoder 124.

Operation

The operation of the DTV 12 will be described with reference to FIG. 4.

Figure 4:
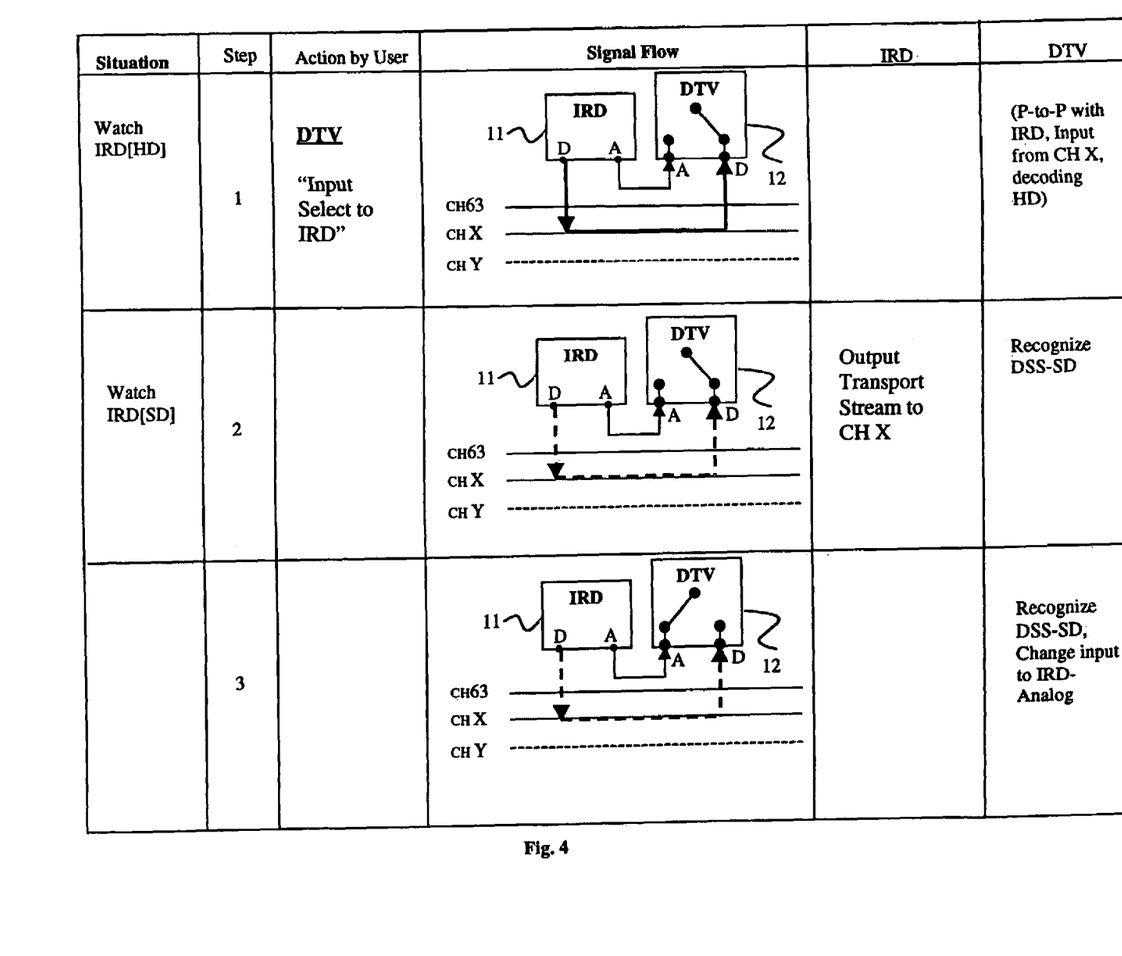
FIG. 4 illustrates operations of a DSS-IRD and a DTV, and the signal flows between them, in steps.

FIG. 4 illustrates an operation of the transmission system step by step. In FIG. 4, the column "Situation" shows a format of the signal transmitted from the DSS-IRD 11. The column "Action by User" indicates the action that a user of the system is taking. Let us assume that the user is watching a satellite TV program received at the DSS-IRD 11 on the DTV 12.

The column "Signal flow" in FIG. 4 shows a signal flow from the DSS-IRD 11 to the DTV 12 and the channel through which the signal is being transmitted. Based on the IEEE1394 Standard, the digital interface cable 14 provides up to 63 isochronous digital communication channels, and allows more than two devices to communicate with each other. These channels are denoted by "CH63," "CH X" and "CH Y" in FIG. 4. Video/Audio cable 16 provides a communication channel for an analog signal. For the case of a digital signal, the channel is assigned dynamically. For the case of an analog signal, unlike the digital signal, once it is connected, there is no dynamic assignment.

The columns "IRD" and "DTV" indicate the operations or workings of the IRD 11 and the DTV 12, respectively.

Assume that the DSS-IRD 11 has been selected by the user to supply an input signal to the DTV 12. The DSS-IRD 11 is receiving a DSS-HD signal at this stage. An isochronous communication, called "point-to-point" connection, has been established between the DSS-IRD 11 and the DTV 12. Receiving a DSS-HD signal, the DSS-IRD 11 is transmitting to the DTV 12 the digital signal in the MPEG2-HD format through one of the digital communication channels, "CH X," as illustrated by an arrow.

Within the DTV 12 (refer to FIG. 3), the incoming digital signal is input to the HD decoder 124 to be decoded into the analog video/audio signal, which the monitor 126 can cope with. The analog output of the HD decoder 124 is then being supplied to the terminal "a" of the switch 128. Since the incoming digital signal is in the HD format, which the DTV 12 is capable of decoding, the switch 128 is making a connection between its terminals "a" and "c." Accordingly, the video/audio signal decoded by the HD decoder 124 is being supplied to the monitor 126.

The format that the DSS-IRD 11 receives has changed, and the DSS-IRD is now receiving a DSS-SD signal. The DSS-IRD 11 decodes the digital signal in the MPEG2-SD format to an analog signal using its SD-decoder 116, and the analog signal is provided to its analog output terminal 112, so that it is transmitted to the DTV 12 through the analog audio/video cable 16. At the same time, the digital signal in the MPEG2-SD format is provided to the digital input/output terminal 110 and transmitted to the DTV 12 via the digital interface cable 14.

The DTV 12 receives the digital signal in the MPEG2-SD format and the analog signal at the digital input/output terminal 120 and the analog input terminal 122, respectively.

Since the DTV 12 only has a HD decoder 124, the digital signal is in an ineligible format. Within the DTV 12, therefore, the HD decoder 124 can no longer provide a usable signal for the monitor 126. Nevertheless, the DTV 12 examines the format of the incoming digital signal and, as it recognizes that it is receiving a digital signal, switches to the analog input terminal 122 from its digital input/output terminal 120.

More specifically, the controller 140 controls the switch 128 based upon the DTV's capability of decoding an incoming digital signal. The controller 140 sends a command to the switch 128 to select the second terminal "b." As a result, the analog signal, which is being decoded in the DSS-IRD 11 and provided to the analog input terminal 122, is directed to the monitor 126 through the connection between the terminals "b" and "c."

Accordingly, the video/audio signal will be provided to monitor 126 in an eligible format even after the format of the transmitted signal has changed. Therefore, the user of the system does not have to manually select the input terminal.

Moreover, in the preferred embodiment of the present invention, the digital signal is provided to the digital input/output terminal 120 of the DTV 12, after the switch 128 makes a connection between terminals "b" and "c." In other words, the format of the digital signal will be examined while the analog signal received at the analog input terminal 122 is being directed to the monitor 126. The input terminal of the DTV 12 will, therefore, be switched back to its digital input/output terminal 120 when the digital signal in the DSS-HD format is transmitted again. The operation explained above will be particularly effective where the format of the transmitted signal changes between digital and analog.

The present invention is applicable in circumstances where:
   a digital signal and an analog signal that have been recorded on a single medium are played back in a digital VHS (DVHS) system
   a DV signal is provided to a digital TV that is incapable of decoding the DV format.

The present invention can also allow digital equipment to be used even if a digital signal is provided in a format that is unknown when the device is designed.

The embodiments of the invention described above are, of course, subject to other variations in structure and implementation. For instance, additional devices may be inserted between various nodes, terminals, and devices in the above embodiments without materially changing their overall function. In general, the scope of the invention should be determined not by the embodiments illustrated but by the appended claims and their legal equivalents.

What is claimed is:

1. A method comprising:
   receiving a digital signal at a digital input terminal of a device;
   receiving an analog signal at an analog input terminal of the device, said analog signal is derived from said digital signal;
   examining whether the digital signal is in an eligible format for the device;

selecting the digital signal by a selector if the digital signal is in the eligible format for a decoder to decode the digital signal, otherwise selecting the analog signal, as an input for the device.

2. The method of claim 1, wherein the digital signal and the analog signal are received simultaneously.

3. The method of claim 1, further comprising displaying one of the digital signal and the analog signal on a monitor.

4. The method of claim 1, further comprising receiving one of the digital signal and the analog signal at a speaker.

5. A method comprising:
receiving a digital signal at a digital input terminal of a device;
receiving an analog signal at an analog input terminal of the device, said analog signal is derived from said digital signal;
determining whether the device is capable of decoding the digital signal;
selecting the digital signal by a selector if the device is capable of decoding the digital signal by a decoder, otherwise selecting the analog signal, as input for the device.

6. The method of claim 5, wherein
the digital signal and the analog signal are received simultaneously.

7. The method of claim 5, further comprising displaying one of the digital signal and the analog signal on a monitor (126).

8. The method of claim 5, further comprising receiving one of the digital signal and the analog signal at a speaker.

9. An apparatus comprising:
a first digital input/output terminal and a second digital input/output terminal;
an analog input terminal and a analog output terminal;
an interface coupled with the first digital input/output terminal;
a decoder coupled with the interface; and
a selector which selects the second digital input terminal if the decoder is capable of decoding a digital signal, otherwise selects the analog input terminal to receive an analog signal that is derived from the digital signal.

10. The apparatus of claim 9, further comprising a monitor having a display and at least one speaker.

11. The apparatus of claim 10, further comprising a memory.

12. The apparatus of claim 11, wherein the memory is configuration ROM.

13. The apparatus of claim 11, wherein the memory is one of a RAM and a ROM.

14. The apparatus of claim 11, wherein the memory stores a signal capability list.

15. The apparatus of claim 14, wherein the signal capability list is static.

16. The apparatus of claim 11, wherein
the selector comprises
a controller having means for determining whether the decoder is capable of decoding the digital signal; and
a switch controlled by the controller so as to select the first digital input/output terminal if the decoder is capable of decoding the digital signal, otherwise to select the analog input terminal.

17. The apparatus of claim 16, wherein the switch switches between an output of the decoder and the analog input terminal as a source of an input signal.

18. The apparatus of claim 17, wherein the digital signal format is dynamic.

19. The apparatus of claim 18, wherein an isochronous connection is established with a device transmitting a signal upon signal selection.

20. A system comprising:
a first digital input/output terminal,
an analog output terminal,
a receiver coupled between an antenna and the first digital input/output terminal, and
a decoder coupled between the analog output terminal and the receiver;
a second digital input/output terminal,
an analog input terminal,
an interface coupled with the second digital input/output terminal,
a decoder coupled with the interface, and
a selector which selects the second digital input terminal if the decoder is capable of decoding a digital signal, otherwise selects the analog input terminal to receive an analog signal that is derived from the digital signal.

21. The system of claim 20, wherein the receiver is capable of receiving signals in DSS-SD format and DSS-HD format.

22. The system of claim 20, wherein the decoder is limited to decoding DSS-SD signals.

23. The system of claim 20, further including a memory.

24. The system of claim 23, wherein the memory is configuration ROM.

25. The system of claim 23, wherein the memory is one of a RAM and a ROM.

26. The system of claim 23, wherein the memory stores a signal capability list.

27. The system of claim 26, wherein the signal capability list is static.

28. The system of claim 20, further comprising:
a monitor (126) having a display and at least one speaker.

29. The system of claim 28, further including a memory.

30. The system of claim 29, wherein the memory is configuration ROM.

31. The system of claim 29, wherein the memory is one of a RAM and a ROM.

32. The system of claim 29, wherein the memory stores a signal capability list.

33. The system of claim 32, wherein the signal capability list is static.

34. The system of claim 20, wherein the selector further comprises
a controller having means for determining whether the decoder is capable of decoding the digital signal; and
a switch controlled by the controller so as to select the second digital input/output terminal if the decoder is capable of decoding the digital signal, otherwise to select the analog input terminal.

35. The system of claim 34, wherein the switch switches between an output of the decoder and the analog input terminal as a source of an input signal.

36. The system of claim 35, wherein the digital signal format is dynamic.

37. The system of claim 34, wherein an isochronous connection is established with a device transmitting a signal upon signal selection.

* * * * *